2,910,370

FROZEN POULTRY PRODUCT AND PREPARATION

Alan Barde Rogers, Palos Park, Ralph W. Kline, Oak Lawn, and Robert L. Niblack, Chicago, Ill., assignors to Armour and Company, Chicago, Ill., a corporation of Illinois No Drawing. Application April 17, 1956
Serial No. 578,599

9 Claims. (Cl. 99—194)

This invention relates to poultry products and more particularly to prepared frozen poultry products which are ready to cook.

In the prior practice it has been customary to freeze parts of poultry in uncooked condition in packages ready for marketing. While this provides some convenience for the consumer, the product still requires thawing of the block of parts, preparation of the parts, as by dipping in batter and breading material, placing in a container for cooking, and finally the cooking of the prepared parts. Attempts have been made to provide in frozen form fully prepared poultry parts which are ready to be heated and served, or to be partially cooked by the consumer, but such attempts have resulted in inferior products which are less palatable than those products heretofore commonly prepared for cooking by the consumer.

Accordingly, it is a general object of this invention to provide a frozen poultry product which is fully prepared for cooking but which when cooked will be at least as palatable as those products prepared by the consumer from frozen uncooked poultry parts. It is a further object to provide a frozen poultry product which when cooked by the consumer will retain the natural meat juices and the natural fresh flavor and tenderness of the poultry. Another object is to provide a frozen poultry product which will have a very low weight loss in preparation for consumption. A still further object of the invention is to provide a frozen poultry product which is simply and quickly prepared by the consumer. Other objects will appear as the specification proceeds.

The product of this invention is a poultry part encased in a coating of uncooked batter, both the poultry part and the batter coating being frozen in an uncooked state. The advantageous qualities of this product are improved by the addition before freezing of a coating of breading material over the batter encasing the poultry part. We have also discovered that additional advantages are derived from the addition of a coating of fat to the batter and breading material coated poultry part.

This product is stored and sold in the frozen state. Preparation by the consumer is simple, the product being merely removed from the freezer and placed in an oven for approximately 50 to 75 minutes at a temperature of approximately 450° F. The object of quick and convenient preparation by the consumer is therefore achieved in the product of this invention, especially since it is possible to freeze and package the product in a container which also serves as a pan for cooking. A golden brown color is obtained without the need for pan browning or frying in deep fat.

Producers of ready-to-cook poultry products have long sought to achieve the preparation of a product which is conveniently and rapidly prepared for serving by the ultimate consumer; and which, when prepared, retains the desirable taste, texture, and color characteristics of a product freshly prepared from raw poultry parts with fresh ingredients. They have also sought to eliminate or minimize the weight loss which occurs during the preparation of the product for consumption.

The general trend in this filed has been toward a product which is wholly or partially pre-cooked. Such products commonly have a weight loss of about 25 to 35% during preparation from the raw state to the finished ready-to-eat state. In the product of the present invention the total weight loss has been reduced to approximately 10%, resulting in the elimination of commercial loss, and bringing to the consumer a poultry product having the best possible flavor and texture.

In the product of the present invention the coating of uncooked batter provides an effective seal against moisture loss. By enveloping the uncooked poultry part in uncooked batter we have provided about the poultry an area which has at least as high a vapor pressure as that within the poultry. Evaporation from the poultry part is therefore inhibited. We have also, in the batter around the poultry part, an absorptive media in which natural juices exuded from the poultry are absorbed, thereby conserving and retaining the natural fresh flavor and nutritive value of the poultry. The breading material on the surface of the part serves to reduce weight loss, not only by obstructing direct loss from the poultry, but also by absorbing fats and juices which are exuded from the poultry and batter. In the prior products the batter is cooked, its moisture content lowered and the moisture sealing function greatly impaired.

The present invention minimizes the problem of fat oxidation. When a poultry product is subjected to a cooking process, physical and chemical changes in the fat occur, and rancidity development, with attendant off-flavors, and the general deterioration of the color, flavor, and texture, is accelerated. In the present invention neither the poultry part, nor the batter, is subjected to any cooking process until prepared for serving by the consumer.

Although other poultry may also be utilized in the invention we have found the chicken product to have particular value and will describe the method of this invention with reference to this type of product.

In the preliminary steps the chicken is slaughtered, cleaned and chilled. In succeeding operations the chicken is cut into parts suitable to be served by the consumer as individual servings. These parts may be processed and packaged as the component parts of a single chicken or the parts may be segregated and processed separately to be packaged as drumsticks, wings, etc.

We prefer to coat the parts with batter in a mechanized continuous operation though the operation may be accomplished by hand. In this operation the parts are placed on a conveyor and are carried through a dip tank in which the parts pick up a coating of batter. We have found a batter of the following composition to be very satisfactory:

27.0% bread flour
3.0% non-fat milk solids
5.0% unstabilized whole egg powder
5.0% salt
0.1% monosodium glutomate
59.9% water The composition of the batter is subject to many variations all within the scope of the invention. We prefer to use a batter containing from 55 to 65% of moisture but a wider range of moisture content may be used with satisfactory results.

The thickness of the batter coating on the chicken part may be controlled by varying the moisture content of the batter. For example, if the moisture content of the batter is decreased the batter will become thicker and a heavier coating on the poultry part will result from the dipping process. Also, the thickness of the coating may be increased by repeating the dipping and subsequent breading operations.

After a coating of batter has been applied to the chicken part, the part is then passed on to the breading operation. In addition to reducing weight loss the dry breading material serves also to dry the surface of the batter coated chicken part, thereby enabling it to be handled in subsequent operations. It also serves, when the chicken part is cooked, to impart a rich golden brown color to the finished product. As the breading material we prefer bread crumbs, though other material such as flour, cracker crumbs, corn meal, flour and egg mixtures, and flour, egg and milk mixtures may be used.

As in the batter coating opeartion, we prefer to apply the breading material in a mechanized continuous process. The operation may be accomplished by hand.

In the next step of the process, before packaging and freezing the product, we may apply either a coating of fat over the breading material or we may place a small quantity of fat on the upper surface of each chicken part. In the latter method we place the batter coated and breaded chicken parts in a container in close contiguous relationship, but always with a surface of each part exposed. On this exposed surface we place a small quantity of fat. One means of accomplishing this is to drop melted fat upon the chilled part. The fat then congeals and adheres to the part. In this step we prefer to use melted butter but other fats such as hydrogenated or unhydrogenated vegetable oil, lard or margarine may be used. In the preferred method the melted butter immediately congeals on the part and a very attractive portion is formed. We may also coat the entire product, in which case the part may be sprayed with melted fat or dipped in the fat. Since the breading material is absorbent, a portion of the fat contacting the coated part is incorporated into the breading material itself.

We prefer, in the step wherein fat is applied to the coated parts, to place the chicken parts in a container which is adapted to packaging and transporting the product in its frozen state, and which is suitable also for use as a pan in which the product may be cooked by the consumer preparatory to serving. Such a container greatly reduces the handling required in the cooking of the product by the ultimate consumer.

After the batter and breading coatings are applied and the fat is added, the product is frozen. At no time in their preparation are the batter or poultry parts subjected to any heating process. The product therefore has excellent keeping qualities. It is simply and conveniently prepared by the consumer and it retains all the wholesomeness and flavor heretofore obtainable only from fresh poultry cooked with fresh ingredients.

Although this invention has been described in connection with a particular embodiment, it will be apparent that changes and modifications may be made by those skilled in the art without departing from the spirit and scope of the invention.

We claim:

1. A method for preparing a frozen poultry product comprising coating a chilled, uncooked poultry part with an uncooked batter, placing a layer of breading material on the batter encased poultry part, said breading material incorporating a quantity of fat, and freezing said part without cooking said batter.

2. A method for preparing a frozen poultry product comprising coating a chilled, uncooked poultry part with an uncooked batter, placing a layer of breading material over the batter covered poultry part, placing a small portion of fat on the surface of said poultry part which has been coated with uncooked batter and with breading material, and freezing the resultant multi-coated poultry part.

3. A method for preparing a frozen poultry product comprising coating a chilled uncooked poultry part with an uncooked batter, placing a layer of bread crumbs over the batter covered poultry part, placing a quantity of butter on the surface of said poultry part which has been coated with uncooked batter and with bread crumbs, and freezing the resultant multi-coated poultry part.

4. A poultry product comprising an uncooked poultry part encased in a coating of uncooked batter, a coating of breading material over said batter coating, and a layer of fat over said batter and breading materials, said poultry part, batter coating, breading material coating and fat layer being in a frozen condition.

5. A poultry product comprising an uncooked poultry part encased in a coating of uncooked batter, a coating of bread crumbs over said batter coating, and a layer of fat over said batter and bread crumbs, said poultry part, batter coating, bread crumb coating and fat layer being in a frozen condition.

6. A poultry product comprising an uncooked poultry part encased in a coating of uncooked batter, a coating of bread crumbs adhering to the batter coated poultry part, a quantity of butter adhering to the said batter and bread crumb coated product, said poultry part uncooked batter coating and bread crumb coating and quantity of butter being in a frozen condition.

7. A poultry product comprising an uncooked poultry part encased in a coating of uncooked batter, a coating of breading material adhering to the batter-coated poultry part, a portion of fat adhering to the surface of said batter and breading material-coated poultry product, said poultry part and uncooked batter coating and breading material and portion of fat being in a frozen condition.

8. A poultry product comprising an uncooked poultry part encased in a coating of uncooked batter, a coating of breading material over said batter coating, said coating of breading material containing fat, said poultry part, batter coating and breading material being in a frozen condition.

9. A poultry product comprising a container suitable for use as a pan for heating said poultry product prior to serving, an uncooked poultry part encased in a coating of uncooked batter disposed within said container, a coating of bread crumbs adhering to the batter-coated poultry part, a quantity of butter adhering to said batter and bread crumb coated product, said poultry part uncooked batter coating in bread crumb coating and quantity of butter being a frozen condition within said container.

References Cited in the file of this patent

UNITED STATES PATENTS

| 2,716,608 | Renish | Aug. 30, 1955 |
| 2,724,651 | Hampton | Nov. 22, 1955 |
| 2,740,721 | Hice et al. | Apr. 3, 1956 |

OTHER REFERENCES

"Everybody's Cook Book," 1937, by I. E. Lord, published by Harcourt, Brace and Company, New York, pp. 616 and 617.

"Food Engineering," November 1951, p. 156.
"Food Engineering," April 1953, p. 192.
"Food Engineering," March 1955, pp. 77 and 180.

Notice of Adverse Decision in Interference

In Interference No. 91,364 involving Patent No. 2,910,370, A. B. Rogers, R. W. Kline, and R. L. Niblack, Frozen poultry product and preparation, final judgment adverse to the patentees was rendered June 22, 1962, as to claims 1 through 8.

[*Official Gazette August 7, 1962.*]